United States Patent Office.

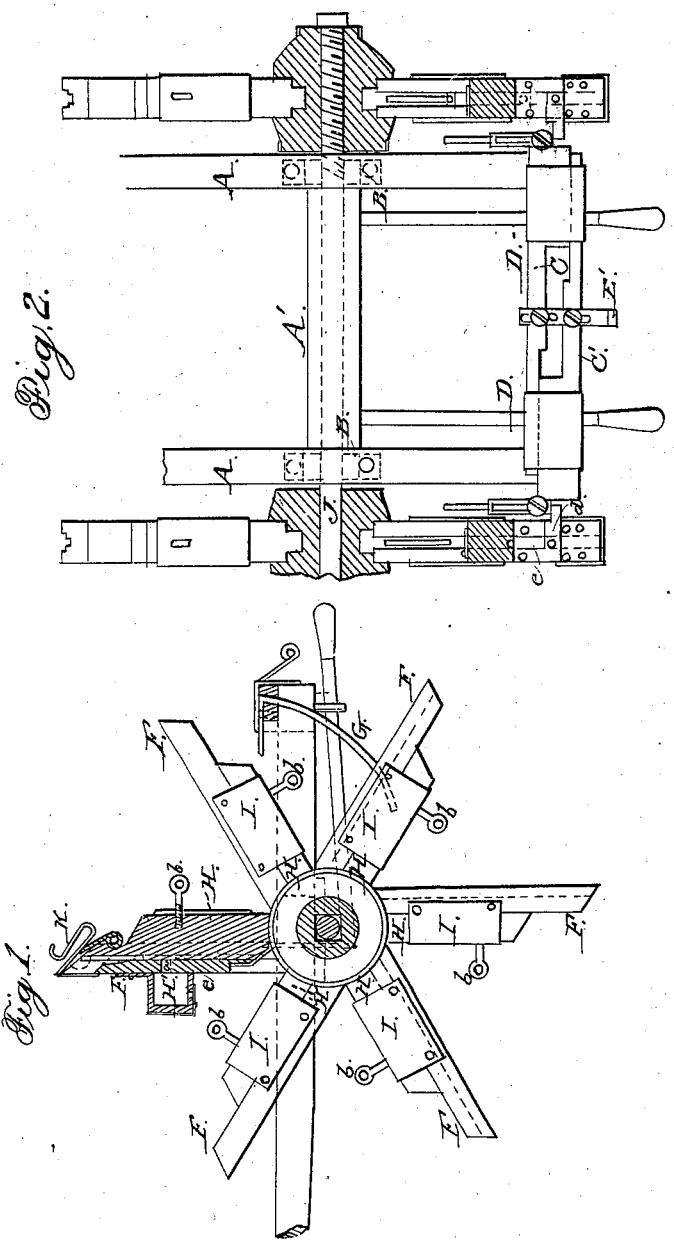

J. DELOSS GREEN, OF ANTRIM, OHIO.

Letters Patent No. 63,038, dated March 19, 1867.

---

IMPROVEMENT IN SEED PLANTERS.

---

The Schedule referred to in these Letters Patent and making part of the same.

---

TO ALL WHOM IT MAY CONCERN:

Be it known that I, J. DELOSS GREEN, of Antrim, in the county of Guernsey, and in the State of Ohio, have invented certain new and useful Improvement in "Seed Planters;" and do hereby declare that the following is a full, clear, and exact description thereof, reference being had to the accompanying drawings, and to the letters of reference marked thereon.

In the annexed drawings making part of this specification, A A represent two frame pieces, which are carried upon a shaft, J. These frame pieces run forward and form shafts for the animal to work between which draws the machine. The rear ends of these frame pieces are connected together firmly by means of a cross-bar, N, and upon this cross-bar are secured by means of metallic boxes or plates two bars C C', which overlap each other, and which slide upon said bar or cross-piece N endwise. The two bars C C' may be held rigidly together by means of a plate, E, provided with set-screws, or in any other known manner, so that a longitudinal adjustment may be given to them for the purpose of widening or narrowing the cams G G, which are secured upon their ends for the purpose hereinafter described. The frame pieces A A are connected to the shaft or axle J by means of the journal boxes B B'. A' represents a cross-piece, which connects the frame pieces A A immediately over the shaft J. D D represent two handles, which are secured at their forward ends to the cross-piece A'. They pass back and rest in staples on the under side of the pieces or bars C C'. The wheels of this machine are provided with spokes H H, but not with felloes or tires. These spokes pass out from the hubs at regular intervals, and are provided with supplementary spokes or bars F F on their outer ends. The bars F F pass into metallic boxes or sleeves I I, which are secured to the spokes H H, and are so arranged as to slide in said boxes when desirable, being secured at any desirable point in them by means of the set-screws $b\ b$. Each one of the supplementary spokes or bars F is provided with a seed box, as seen at H'. The seed boxes are provided at their bottoms with seed slides $e$, which said slides are provided with seed openings $a$. The slides $e$ have small bars or plates $d$ secured to them, which are operated upon by means of the cams G G, which said cams are attached adjustably to the outer ends of the bars C C'. The cams G G operate upon the plates $d$, and throw the slides $e$ outward, while springs $i$ serve to draw them back again. The seed cup $a$ in the slide $e$ being filled with grain, and the cam G throwing the slide outward, the grain is carried from box H' and deposited by the seed cup in a groove in the supplementary spoke or bar F, and lodges in a cup or box at its end. K represents a spring cover to this box or cup. When the spoke turns around so as to strike the ground the earth operates upon the spring cover K, opening it and allowing the grain to escape. As each seed box upon the spokes passes the cam G, said cam operates upon its slide so as to throw the seed out of box H' into the groove in the spoke and the box in its end, so that it can be deposited in the ground by the opening of the cover K as soon as the earth strikes said cover. As often as the cam operates the slide in one direction, the spring $i$ operates in the other, drawing it back to receive another supply of seed. By lengthening the spokes the grain is deposited in hills further apart in the rows or line of direction of the machine. The rows may be widened by separating the wheels by means of the thread cut upon one end of the axle.

Having thus fully described my invention, what I claim as new, and desire to secure by Letters Patent, is—

1. Providing the spokes H H with adjustable supplementary spokes or bars F, which carry seed boxes and slides, as and for the purpose herein set forth.

2. The arrangement of the overlapping and adjustable bars C C', with the cams G G, and seed slides $e\ e$, substantially as and for the purpose specified.

3. The automatic covers K, upon the ends of the supplementary spokes F for the purpose of discharging the grain, substantially as specified.

In testimony that I claim the foregoing, I have hereunto set my hand this 25th day of January, 1867.

J. DELOSS GREEN.

Witnesses:
JAMES D. THOMPSON,
JOHN H. HUGHES.